Feb. 5, 1957  C. L. GRAHAM  2,780,143
TANDEM ROCKET LAUNCHER
Filed Aug. 18, 1952  2 Sheets-Sheet 1

INVENTOR:
CONNELLY L. GRAHAM
HIS PATENT ATTORNEY

Feb. 5, 1957  C. L. GRAHAM  2,780,143
TANDEM ROCKET LAUNCHER
Filed Aug. 18, 1952  2 Sheets-Sheet 2
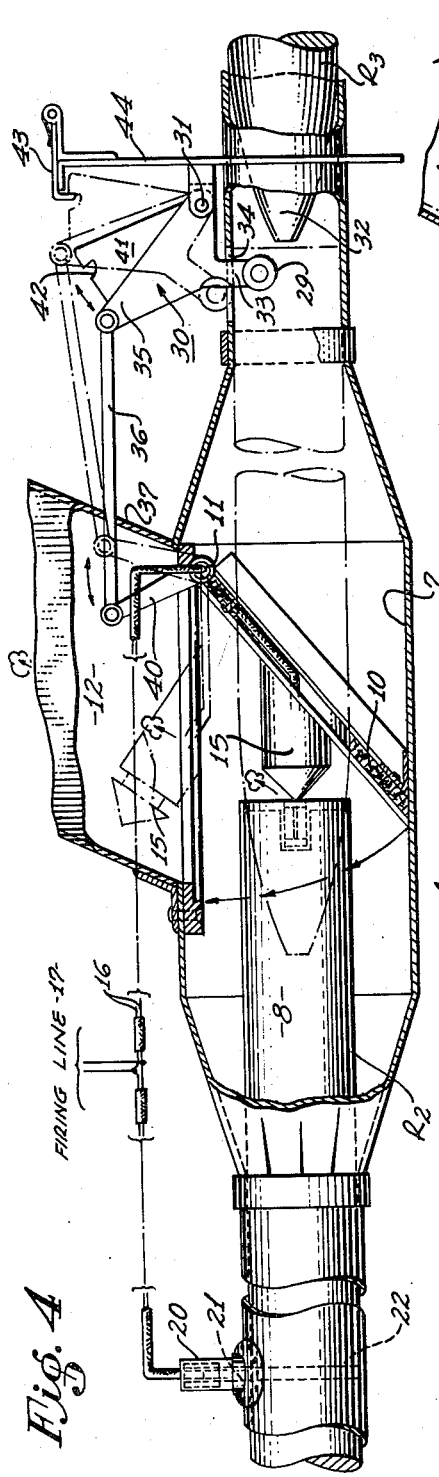
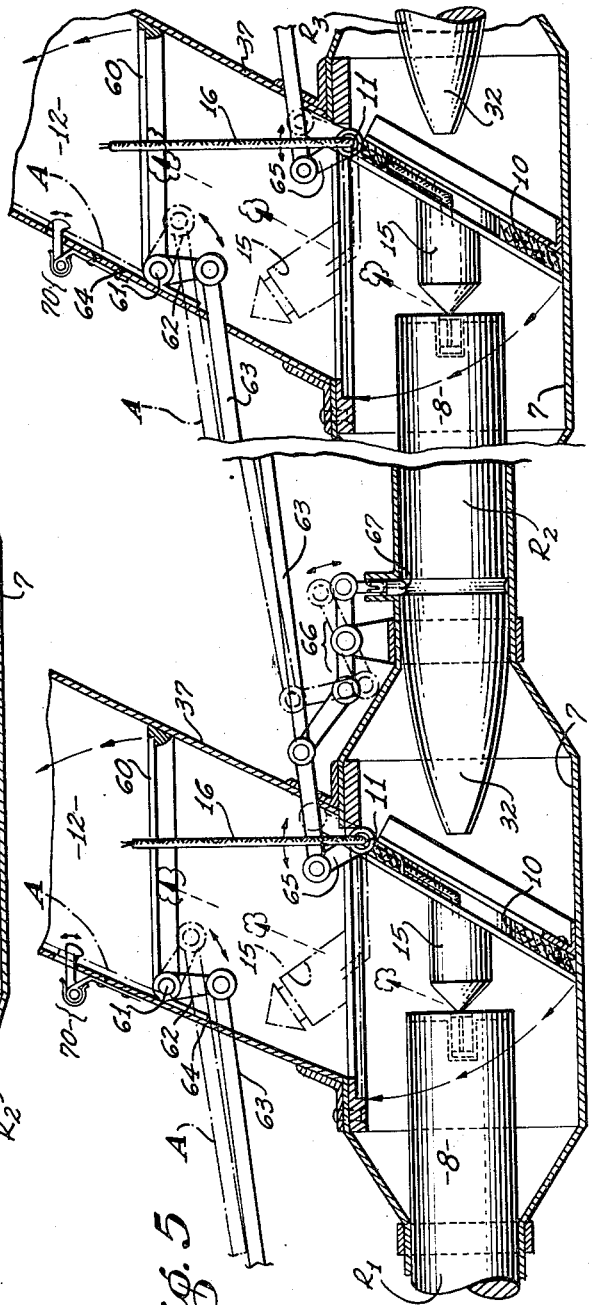
INVENTOR:
CONNELLY L. GRAHAM
BY Herbert S. Metcalf
HIS PATENT ATTORNEY

United States Patent Office 2,780,143
Patented Feb. 5, 1957

2,780,143

TANDEM ROCKET LAUNCHER

Connelly L. Graham, Covina, Calif., assignor to Northrop Aircraft, Inc., Hawthorne, Calif., a corporation of California Application August 18, 1952, Serial No. 304,899

2 Claims. (Cl. 89—1.7)

My invention relates to rocket launching tubes and more particularly to launching tubes wherein rockets can be loaded in tandem and fired in sequence beginning with the foremost rocket.

Among the objects of the present invention:

To provide a rocket launching device creating a minimum cross sectional area.

To provide a rocket launching device, for a plurality of rockets, creating a minimum cross sectional area.

To provide a means for firing rockets loaded in tandem in a rocket launching tube.

To provide a means for preventing interference while firing tandem loaded rockets.

To provide a means for protecting rearwardly positioned rockets, when tandem loaded, during firing of forwardly positioned rockets.

To provide a rocket launching device ideally suited for airplane use.

And to provide a simple and effective means for the fire control of tandem loaded rockets.

In brief, my invention includes a rocket launching tube in which rockets are loaded in tandem and sequentially fired, beginning with the forwardmost rocket. Means are provided at the rear of each intermediate rocket and forwardly of the nose of the next rocket to divert the rocket exhaust gases laterally, and means are additionally provided to move the gas diversion means out of the path of the next following rocket as it is fired. In this manner a plurality of rockets can be loaded into and fired from a single launching tube, thereby reducing drag when such a tube is used on an airplane. The word "rocket" as used herein is used as including both guided and unguided reaction driven or self-propelled missiles.

For a further understanding of the invention a description will be given of the appended drawings in which:

Figure 4 is an enlarged fragmentary longitudinal sectional view of the exhaust gas gate and linkage used in the device of Figures 2 and 3.

Figure 5 is an enlarged fragmentary longitudinal sectional view of a modified type exhaust gas gate linkage embodying the present invention.

Figure 1:
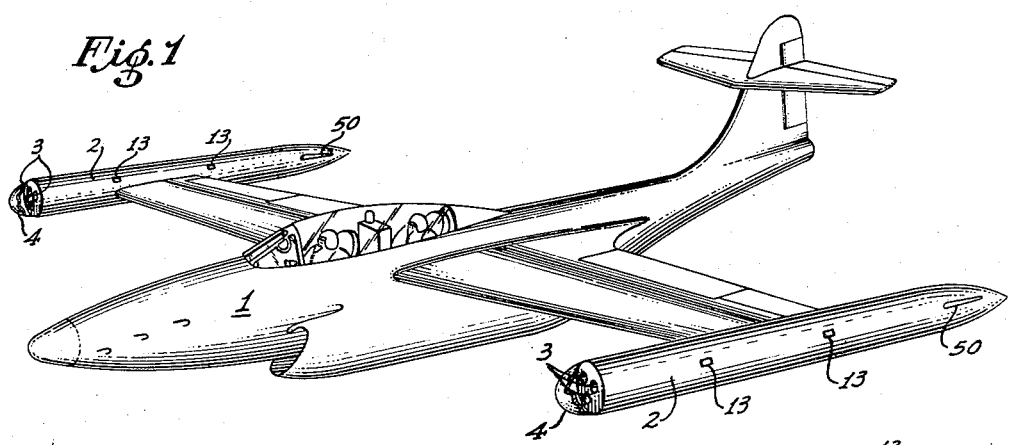
Figure 1 is a perspective view of an airplane having wing tip pods in which launching tubes of the present invention are used.

Referring first to Figure 1 a jet driven airplane 1 is fitted with wing tip rocket pods 2, each of these pods 2 carrying three tandem rocket launching tubes as indicated by their forward openings 3 seen through a transparent frangible pod tip 4 used to streamline the pods 2 before rocket firing occurs. The first rocket fired breaks this tip 4 to provide free passage for all subsequently fired rockets.

Figure 2:
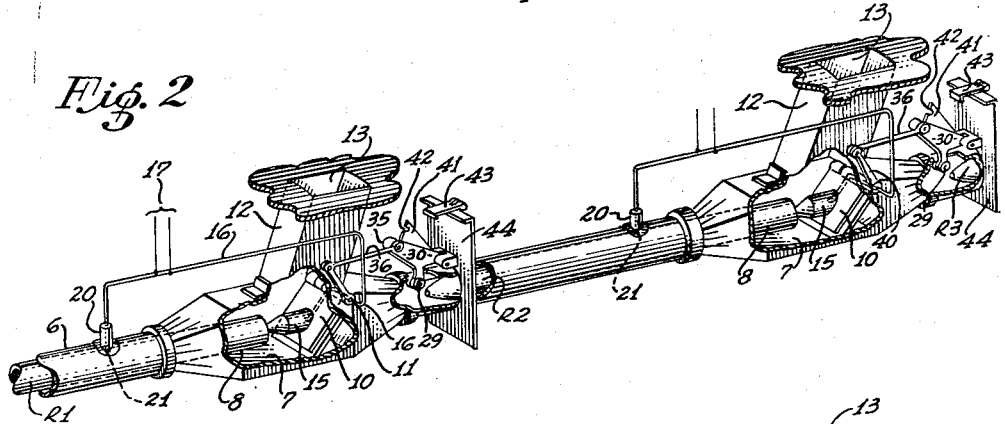
Figure 2 is a fragmentary, diagrammatic view in perspective of one form of tandem rocket launching tube embodying the present invention, with a plurality of rockets loaded therein.

In the pods 2 shown in Figure 1, each launching tube 6 is loaded with three rockets $R_1$, $R_2$ and $R_3$ in tandem as shown in Figure 2. $R_1$, and $R_3$ are shown only in part with $R_2$ representing an intermediate rocket. As more than three rockets can be loaded in one tube, $R_3$ represents the most rearward rocket in the tube 6.

When the rockets are so tandem loaded, the nose of each intermediate rocket $R_2$ must be protected from the hot exhaust gases generated by the firing of the immediately preceding rocket $R_1$, and any gas diversion means used to protect any rocket positioned just rearwardly of a fired rocket, must be cleared from the path of the next rocket to be fired and stay cleared for the passage of all the remainder of the rockets loaded in the tube.

Figure 3:
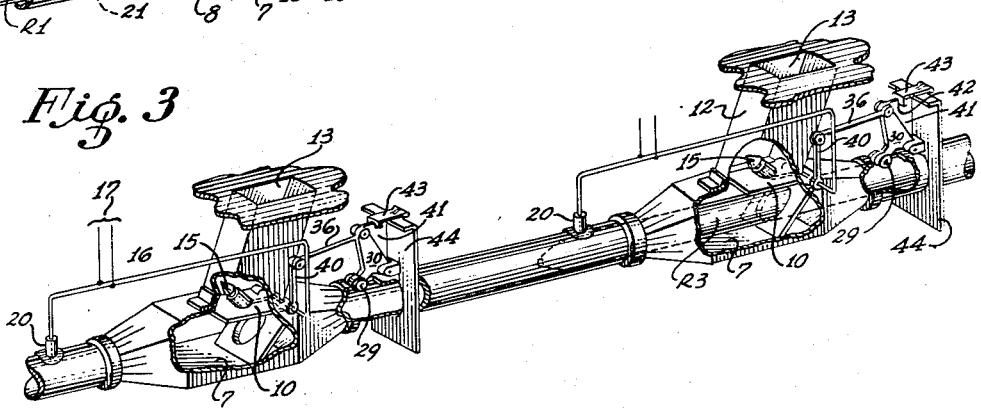
Figure 3 is a fragmentary diagrammatic view in perspective of the launching tube of Figure 2 with a rearwardly loaded rocket shown as it is moving through the tube.

Referring to Figures 2, 3 and 4, the rocket launching tubes 6 are generally circular in cross section except at the rear of each rocket, at which places each tube 6 is enlarged to rectangular cross section to form exhaust gas chambers 7.

As best shown in Figures 2 and 4, each rocket except the most rearward, has the exhaust end 8 thereof normally positioned slightly forward of the center of each exhaust gas chamber 7.

Immediately at the rear of each rocket, except the most rearward $R_3$, is a gas diversion baffle 10 mounted to rotate on a hinge 11 and slanted forwardly to direct exhaust gases from the exhaust end 8 of the rocket just forward thereof, laterally into an exhaust channel 12 opening at exhaust ports 13 at the side of the pod 2 in which the tubes 6 are mounted (Figure 1).

Each baffle 10 carries a forwardly extending igniter 15 contacting the exhaust end 8 of the forwardly adjacent rocket. Firing wires 16 from igniters 15 are led along the backs of baffles 10 through hinges 11 to firing line 17. Firing line 17 is under control of the aircraft crew. The particular type of igniter to be used is no part of the present invention, the type shown being illustrative only.

Firing line 17 is also connected to solenoid 20 which, simultaneously with the operation of igniter 15, withdraws a rocket positioning pin 21 from rocket groove 22 thus freeing the rocket to move in tube 6, as best shown in Figure 4. While baffles 10 will protect the nose of the next following rocket from the exhaust gases of the fired forward rocket, these baffles normally are in the path of all following rockets, so I provide means for moving each baffle 10 out of the path of the next following rocket, operating as this next following rocket is fired. One such device is shown in Figures 2, 3 and 4.

Here, a roller 29 is mounted on bell crank 30, this crank being mounted on hinge pin 31 outside of tube 6 so that normally a roller 29 is inside tube 6 just ahead of the noses 32 of all rockets except the most forward rocket. The roller arm 33 of crank 30 passing through slot 34 in tube 6 is best shown in Figure 4. A linkage arm 35 of crank 30 is connected to a forwardly extending rod 36 which passes through rear wall 37 of the exhaust gas channel 12 forwardly adjacent a bell crank 30. Inside channel 12 rod 36 is attached to a baffle arm 40 extending into channel 12 from baffle hinge 11.

Linkage arm 36 also carries a rearwardly extending catch plate 41 having a top notch 42 therein engageable with a spring 43 mounted on catch plate 44 attached to tube 6 adjacent crank hinge pin 31.

In the operation of the device shown in Figures 2, 3, and 4, when the firing line 17 is energised, the pin 21 releases the rocket, and the igniter 15 simultaneously fires the first rocket $R_1$ in the tube 6. This first rocket then moves out of the tube through forward opening 3 (in Figure 1), the rearwardly adjacent baffle 10 diverting all gases to the atmosphere and remaining in position blocking the path of the next rocket R₂.

When this next rocket R₂ is fired, the exhaust gas thereof will be directed laterally by the rearwardly adjacent baffle 10 and exhaust channel 12, and as rocket R₂ moves forward in tube 6, the roller 29 will be moved laterally to the extent that it will move bell crank 30 to cause notch 42 to lock into catch 43. Bell crank 30 will also cause the connected baffle 10 to rotate laterally on hinge 11 and swing out of the path of the moving rocket R₂. Catch 41 insures that baffle 10 will stay in its lateral position thereafter as shown at left in Figure 3. Thus each rocket in its first forward motion after firing, causes the baffle 10 immediately forward of the nose 32 thereof, to move out of the way of the moving rocket and stay out of the way of all subsequent rockets fired through the same tube 6.

As there are no more rockets behind the rear rocket R₃, no movable baffle is required at the rear of that rocket, and the exhaust gases therefrom can be exhausted straight rearwardly through elongated rear exhaust port 50, for example (Figure 1). Further, no baffle is required in front of the most forwardly loaded rocket.

In Figure 5 I have shown a modification of the present invention where a baffle 10 immediately forward of a rocket such as R₂ is moved out of the way of the latter rocket, not by movement of the rocket body, but by movement of the exhaust gases of that rocket.

To this end, I provide, in each channel 12, a flap 60 normally closing channel 12. Flap 60 is forwardly mounted on flap hinge 61 to swing outwardly in channel 12 and, at this point, is provided with a rod operating arm 62 to which a flap rod 63 is attached, extending forwardly through forward wall 64 of channel 12, and then through rear wall 37 of the next forwardly positioned channel 12. Rod 63 is there attached to a baffle operating arm 65, similar to baffle arm 40 in the device of Figures 2, 3 and 4. If desired, in this case a rocket positioning pin 67 can be withdrawn by linkage 66 attached to flap rod 63.

In this modification, when the rocket R₂ is fired, after rocket R₁ has left the tube the exhaust gases from exhaust end 8 of rocket R₂ move the flap 60 in the path of the gas, outwardly in channel 12 thereby withdrawing pin 67 to free the rocket R₂, and simultaneously moves the forwardly connected baffle 10 laterally out of the way of the fired rocket R₂ as indicated by broken line A. In this case also, a flap 60 will be used in position to be moved by the exhaust gas of the last fired rocket R₃. Linkage catch 70 keeps the flaps open after firing. Thus in both modifications, the baffle 10 in front of the nose 32 of a rocket, is moved out of the way of the rocket when the latter is fired, by movement of a portion of the rearwardly adjacent rocket. In the first described instance, it is the movement of the rocket body; and in the secondly described example, it is the movement of the rocket gases, that actuates the baffle 10 just ahead of the fired rocket.

While in order to comply with the statute, the invention has been described in language more or less specific as to structural features, it is to be understood that the invention is not limited to the specific features shown, but that the means and construction herein disclosed comprise several modes of a preferred form of putting the invention into effect, and the invention is therefore claimed in any of its forms or modifications within the legitimate and valid scope of the appended claims.

What is claimed is:

1. A device of the class described including: a tube in which a plurality of rockets may be loaded in tandem for subsequent firing therefrom, means attached to said tube at the rear of each rocket defining a laterally extending exhaust gas channel venting said tube to the atmosphere, a plurality of movable gas baffles, one of said baffles being attached to said tube at the rear of each rocket and between said rear and the nose of the next rocket, said baffles normally blocking the exit of the rockets positioned rearwardly thereof, said baffles being positioned to direct gases from the adjacent rear of first fired rocket into the adjacent exhaust gas channel, a plurality of cams mounted on said tube, one of said cams being positioned to be moved by movement of each of said rockets following the first of said rockets to be fired, and a linkage connecting said cams with the baffle at the nose of each respective rocket, said linkages being proportioned to move said baffles out of the path of each rocket in accordance with cam movement when the rocket is moved by the firing thereof.

2. A device of the class described including: a tube in which a plurality of rockets may be loaded in tandem for subsequent firing therefrom, means attached to said tube at the rear of each rocket defining a laterally extending exhaust gas channel venting said tube to the atmosphere, a plurality of movable gas baffles, one of said baffles being attached to said tube at the rear of each rocket and between said rear and the nose of the next rocket, said baffles normally blocking the exit of the rockets positioned rearwardly thereof, said baffles being positioned to direct gases from the adjacent rear of first fired rocket into the adjacent exhaust gas channel, a plurality of movable flaps, one of said flaps being mounted to move in each of said exhaust gas channels and positioned to be moved by exhaust gas passing through said channels, and a linkage connecting each of said flaps with the baffle at the nose of each respective rocket, said linkage being proportioned to move said baffles out of the path of each rocket in accordance with movement of a flap in the path of exhaust gas when the rockets are fired.

References Cited in the file of this patent

UNITED STATES PATENTS

| 2,313,030 | Tauschek | Mar. 2, 1943 |
| 2,409,210 | Jolly | Oct. 15, 1946 |
| 2,445,423 | Eastman | July 20, 1948 |
| 2,451,522 | Uhl et al. | Oct. 19, 1948 |
| 2,517,333 | Motley | Aug. 1, 1950 |
| 2,701,985 | Smith | Feb. 15, 1955 |

FOREIGN PATENTS

| 665,970 | Germany | Oct. 7, 1938 |
| 914,341 | France | Oct. 4, 1946 |
| 924,013 | France | July 24, 1947 |